United States Patent Office 3,712,895
Patented Jan. 23, 1973

3,712,895
1-CYCLOHEXYLMETHYL-6-HYDROXY-
1,2,3,4-TETRAHYDROISOQUINOLINE
Eisaku Yamato, Yono, Yuji Miura, Kawaguchi, Masao
Wada, Warabi, Toshio Sekiguchi, Kawasaki, Masazumi-
Kawanishi, Tokyo, Masanori Sato, Toda, Masao Hoshi-
yama, Tokyo, and Taku Nagao, Warabi, Japan, as-
signors to Tanabe Seiyaku Co., Ltd., Osaka, Japan
No Drawing. Original application Jan. 16, 1970, Ser. No.
3,533. Divided and this application Dec. 13, 1971,
Ser. No. 207,599
Claims priority, application Japan, Jan. 25, 1969,
44/5,491
Int. Cl. C07d 35/28
U.S. Cl. 260—289 R          1 Claim

ABSTRACT OF THE DISCLOSURE

A compound having the formula

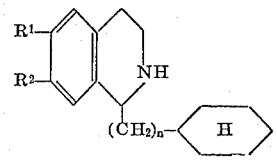

wherein one of $R^1$ and $R^2$ is a hydroxy group or an alkanoyloxy group having 1 to 6 carbon atoms and the other is hydrogen and $n$ is 1–3 is produced.

A compound having the formula

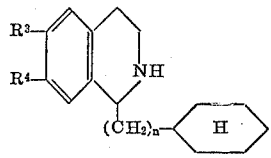

wherein one of $R^3$ and $R^4$ is an alkoxy group and the other is hydrogen and $n$ is as defined above, is dealkylated to produce a 1-substituted-6- or -7-hydroxy-1,2,3,4-tetrahydroisoquinoline compound. When $R^1$ or $R^2$ is alkanoyloxy, the hydroxyl group of said 1-substituted-6- or -7-hydroxy-1,2,3,4-tetrahydroisoquinoline compound is selectively acylated with an alkanoyl halide having 1–6 carbon atoms.

The compounds of the present invention are useful as peripheral vasodilators.

---

This is a division of application Ser. No. 3,533, filed Jan. 16, 1970, now abandoned.

This invention relates to novel derivatives of 1,2,3,4-tetrahydroisoquinoline and a process for preparing same.

The 1,2,3,4-tetrahydroisoquinoline derivatives of the instant invention are represented by the formula:

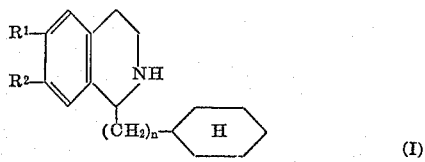

(I)

wherein one of $R^1$ and $R^2$ is a hydroxy radical or an alkanoyloxy radical having from 1 to 6 carbon atoms and the other of $R^1$ and $R^2$ is a hydrogen atom and $n$ is an integer from 1 to 3. Pharmaceutically acceptable acid addition salts of the foregoing derivatives are also included within the scope of the present invention.

It has been found that the above-mentioned novel tetrahydroisoquinoline compounds and their acid addition salts are useful as peripheral vasodilators. For example, tetrahydroisoquinoline compounds having the Formula I exert a potent vasodilating action on the common carotid artery. Their activity on said artery is comparable or superior to that of 1-(4-hydroxyphenyl) - 1 - hydroxy-2-n-butylaminoethane sulfate. As compared with 1-(4 - hydroxyphenyl) - 1 - hydroxy - 2 - n - butylaminoethane sulfate, 1-cyclohexylmethyl-6-hydroxy - 1,2,3,4 - tetrahydroisoquinoline (hydrochloride) and its O-acetyl, O-propionyl or O-butyryl ester, 1-cyclohexylmethyl-7-hydroxy-1,2,3,4-tetrahydroisoquinoline (hydrochloride) and its O-acetyl, O-propionyl or O-butyryl ester, 1-(2-cyclohexylethyl) - 7 - hydroxy - 1,2,3,4 - tetrahydroisoquinoline (hydrochloride), etc., in particular, exhibit a more potent vasodilating action on the common carotid arteries of dogs (body weight of 8 to 16 kg.) when intravenously administered to said dogs in a dose of 0.3 mg./kg.

The tetrahydroisoquinoline compounds (I) also have a potent cutaneous vasodilating action. Some of the compounds (I), as for example 1-cyclohexylmethyl-7-butyryloxy - 1,2,3,4 - tetrahydroisoquinoline (hydrochloride), 1-(2-cyclohexylethyl) - 7 - hydroxy - 1,2,3,4 - tetrahydroisoquinoline (hydrochloride) and 1-(3-cyclohexylpropyl)-7-hydroxy-1,2,3,4-tetrahydroisoquinoline (hydrochloride) increased the flow rate of blood in the auricular blood vessel of the rabbits (body weight 4.0 to 4.5 kg.) about 3 times as much as did papaverine when they were respectively administered into said vessel at a dose of 5 µg./ear.

Additionally, the toxicity of the tetrahydroisoquinoline compounds (I) is relatively low. For example, when administered intravenously in mice, the acute toxicity ($LD_{50}$) of 1 - cyclohexylmethyl - 6 - hydroxy - 1,2,3,4-tetrahydroisoquinoline (phosphate) is 85 mg./kg.

According to the present invention, a compound of the Formula I can be prepared by dealkylating a compound of the formula:

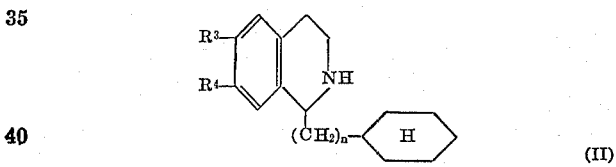

(II)

wherein one of $R^3$ and $R^4$ is an alkoxy group and the other is a hydrogen atom, and $n$ is as defined above, and if necessary, subjecting the resulting 1-substituted-6- or 7-hydroxy-1,2,3,4-tetrahydroisoquinoline to selective acylation of its hydroxy group.

The starting compound (II) is readily obtainable. For example, it may be produced by heating 3-or 4-alkoxyphenethylamine for a few hours in an oil bath with an acid represented by the formula:

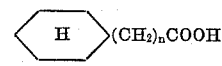$(CH_2)_nCOOH$ wherein $n$ is as defined above, treating the resulting amide compound with phosphorus pentoxide at an elevated temperature, and hydrogenating the resulting 1-substituted-6 or 7-alkoxy-3,4-dihydroisoquinoline with sodium borohydride.

As stated above, one of $R^3$ and $R^4$ is an alkoxy group. Suitable alkoxy groups include for example methoxy, ethoxy, propoxy, butoxy and an alkoxy group having from 1 to 6 carbon atoms.

The dealkylation reaction of the present invention can be performed by a conventional manner. The dealkylation reaction is preferably carried out by acid hydrolysis. Compound (II) is treated with a strong inorganic acid (e.g., hydrochloric acid, hydrobromic acid). The acid hydrolysis reaction is preferably carried out at elevated temperature and in an aqueous solution containing concentrated inorganic acid. After the reaction is completed, the resulting product, i.e., the corresponding 6- or 7-hydroxy-tetrahydroisoquinoline compound may be precipitated as crystals from the reaction solution.

The selective acylation of the hydroxy group of said resulting reaction product can be carried out by treating said product with an alkanoyl halide having 1 to 6 carbon atoms (e.g., acetyl halide, propionyl halide, butyryl halide) under acid conditions (e.g., in the presence of hydrogen halide). The reaction is preferably carried out at room temperature or at an elevated temperature. Chloroform, dichloromethane, dimethylformamide or a fatty acid corresponding to the alkanoyl halide employed may be suitably used as the reaction solvent.

The tetrahydroisoquinoline compound (I) thus obtained can be employed for pharmaceutical use either as the free base or its salt. The free base and its salt are readily convertible one to the other by conventional manner. Preferred therapeutically acceptable salts includes salts formed by reacting the free base with an inorganic acid, as for example, hydrochloric acid, hydrobromic acid, perchloric acid, nitric acid, sulfuric acid or phosphoric acid, or an organic acid, as for example, formic acid, acetic acid, propionic acid, glycollic acid, lactic acid, pyruvic acid, oxalic acid, malonic acid, succinic acid, maleic acid, fumaric acid, malic acid, citric acid, tartaric acid, ascorbic acid, hydroxymaleic acid, benzoic acid, phenylacetic acid, aminobenzoic acid, methanesulfonic acid, ethanesulfonic acid, benzenesulfonic acid, p-toluenesulfonic acid, sulfamilic acid, aspartic acid or glutamic acid. The tetrahydroisoquinoline compound (I) may be incorporated within a pharmaceutical preparation in conjunction with or admixed with a pharmaceutical excipient that is suitable for enteral or parenteral administration.

Excipients which do not react with the tetrahydroisoquinoline compound (I) should be selected. Gelatin, lactose, glucose, sodium chloride, starch, magnesium stearate, talcum, vegetable oils, benzyl alcohol, gums, are suitable. Other known medicinal excipients may be employed. The pharmaceutical preparation may be, for example, a solid dosage form such as a tablet, a coated tablet, a pill or a capsule; or in liquid dosage form such as, for example, a solution, a suspension or an emulsion. The pharmaceutical preparation may be sterilized and/or may contain auxiliaries, such as preserving, stabilizing, wetting or emulsifying agents. The pharmaceutical preparation may further contain other therapeutically valuable substances.

Practical and presently-preferred embodiments of the present invention are illustratively shown in the following examples.

EXAMPLE 1

A mixture of 15 g. of 1-cyclohexylmethyl-6-methoxy-1,2,3,4-tetrahydroisoquinoline hydrochloride, 150 ml. of 47% hydrobromic acid and 0.3 ml. of aqueous hypophosphorous acid solution is refluxed for 5 hours. The mixture is allowed to cool and the resulting crystals are collected by filtration. The crystals are dissolved in 300 ml. of water with the aid of heat. 300 ml. of 35% hydrochloric acid are added to the resultant solution. The mixture is then allowed to stand and the resulting crystals are collected by filtration. The crystals are recrystallized from 0.5% hydrochloric acid to give 11.9 g. of 1-cyclohexylmethyl-6-hydroxy-1,2,3,4 - tetrahydroisoquinoline hydrochloride.

M.P. 251–253° C. (decomp.). The crystals are colorless and scaly. Yield: 81.7%.

The crystals are recrystallized from a mixture of methanol and ether to give colorless fine needles melting at 253–255° C.

Analysis.—Calcd. for $C_{16}H_{23}ON \cdot HCl$ (percent): C, 68.14; H, 8.58; N, 4.97; Cl, 12.57. Found (percent): C, 68.19; H, 8.69; N, 4.85; Cl, 12.77.

EXAMPLE 2

4 g. of 1-cyclohexylmethyl-6-methoxy-1,2,3,4-tetrahydroisoquinoline hydrochloride and 20 ml. of 35% hydrochloric acid are put into a sealed bottle, and heated for 2 hours in an oil bath at a temperature of 160° C. The mixture is allowed to cool and 3.6 g. of the resulting crystals are collected by filtration. The crystals are dissolved in 100 ml. of water with the aid of heat. The resultant solution is decolorized with activated carbon and filtered. 20 ml. of 35% hydrochloric acid are added to the filtrate. The acidified filtrate is allowed to stand and the resulting crystals are collected by filtration and dried. 3.2 g. of 1-cyclohexylmethyl - 6 - hydroxy - 1,2,3,4 - tetrahydroisoquinoline hydrochloride are obtained.

M.P. 252–254° C. The crystals are colorless and scaly. Yield: 84.3%.

The crystals are recrystallized from a mixture of methanol and ether to give colorless fine needles melting at 253–255° C.

The melting point depression of this product reveals that this product is identical to the crystals obtained in Example 1. The infrared spectrum of this product is also identical to that of the crystals obtained in Example 1.

The free base is obtained from the hydrochloride salt by neutralizing the salt with sodium carbonate and extracting the base with chloroform.

M.P. 168–169° C. Colorless prisms (after recrystalliza from isopropanol).

Analysis.—Calcd. for $C_{16}H_{23}NO$ (percent): C, 78.32; H, 9.44; N, 5.71. Found (percent): C, 78.10; H, 9.52; N, 5.72.

EXAMPLE 3

A mixture of 19.7 g. of 1-cyclohexylmethyl-7-methoxy-1,2,3,4-tetrahydroisoquinoline hydrochloride, 150 ml. of 47% hydrobromic acid and 1.0 g. of hypophosphorus acid is refluxed for 5 hours. The mixture is then allowed to cool and the resulting crystals are collected by filtration. The crystals are dissolved in 170 ml. of water with the aid of heat. The resultant solution is decolorized with activated carbon and filtered. 70 ml. of 35% hydrochloric acid are added to the filtrate. The acidified filtrate is then allowed to stand. The resulting crystals are collected by filtration. The crystals thus obtained are dissolved in 300 ml. of water with the aid of heat. 50 ml. of 35% hydrochloric acid are added to the solution. The acidified solution is allowed to cool and the resulting crystals are collected by filtration. 14.7 g. of 1-cyclohexylmethyl-7-hydroxy-1,2,3,4-tetrahydroisoquinoline hydrochloride are obtained.

M.P. 250–251° C. (decomp.). Colorless fine needles. Yield: 78.6%.

Analysis.—Calcd. for $C_{16}H_{23}ON \cdot HCl$ (percent): C, 68.14; H, 8.58; N, 4.97; Cl, 12.57. Found (percent): C, 68.18; H, 8.78; N, 4.95; Cl, 12.20.

EXAMPLE 4

2 g. of 1-cyclohexylmethyl-7-methoxy-1,2,3,4-tetrahydroisoquinoline hydrochloride and 13 ml. of 35% hydrochloric acid are placed into a sealed bottle, and heated for 2 hours in an oil bath at a temperature of 160° C. The mixture is allowed to cool and the resultant crystals are collected by filtration. The crystals thus obtained are dissolved in ethanol. The ethanol solution is decolorized with activated carbon and filtered. The filtrate is evaporated to remove solvent. The residue obtained is recrystallized from a mixture of ethanol and isopropyl ether. 17.4 g. of 1-cyclohexylmethyl-7-hydroxy-1,2,3,4-tetrahydroisoquinoline hydrochloride are thereby obtained.

M.P. 250–251° C. (decomp.). Colorless prisms. Yield: 91.3%.

The melting point depression of this product reveals that this product is identical to the crystals obtained in Example 3. The infrared spectrum of this product is also identical to that of the crystals obtained in Example 3.

The free base is obtained from the hydrochloride salt by neutralizing the salt with sodium carbonate and extracting the base with chloroform.

M.P. 170–171° C. Colorless prisms (after recrystallization from isopropanol).

*Analysis.*—Calcd. for $C_{16}H_{23}NO$ (percent): C, 78.32; H, 9.44; N, 5.71. Found (percent): C, 78.20; H, 9.60; N, 5.67.

EXAMPLE 5

5.01 g. of 1-(2-cyclohexylethyl)-6-methoxy-1,2,3,4-tetrahydroisoquinoline hydrochloride are treated in the same manner as described in Example 1. 4.67 g. of 1-(2-cyclohexylethyl)-6-hydroxy - 1,2,3,4 - tetrahydroisoquinoline hydrochloride are obtained.

M.P. 250–251° C. (decomp.). Colorless prisms (recrystallized from methanol-ether). Yield: 97.5%.

*Analysis.*—Calcd. for $C_{17}H_{20}ON \cdot HCl$ (percent): C, 68.98; H, 8.85; N, 4.73; Cl, 11.98. Found (percent): C, 68.74; H, 9.02; N, 4.77; Cl, 12.37.

EXAMPLE 6

5.7 g. of 1-(2-cyclohexylethyl)-7-methoxy-1,2,3,4-tetrahydroisoquinoline hydrochloride are treated in the same manner as described in Example 4. 3.8 g. of 1-(2-cyclohexylethyl) - 7 - hydroxy - 1,2,3,4 - tetrahydroisoquinoline hydrochloride are obtained.

M.P. 241–242° C. (decomp.). Colorless needles (recrystallized from ethanol-ether). Yield 70%.

*Analysis.*—Calcd. for $C_{17}H_{20}ON \cdot HCl$ (percent): C, 68.98; H, 8.85; N, 4.73; Cl, 11.98. Found (percent): C, 68.83; H, 8.92; N, 4.63; Cl, 12.30.

EXAMPLE 7

5 g. of 1-(3-cyclohexylpropyl)-6-methoxy-1,2,3,4-tetrahydroisoquinoline hydrochloride are treated in the same manner as described in Example 1. 4.32 g. of 1-(3-cyclohexylpropyl)-6-hydroxy-1,2,3,4-tetrahydroisoquinoline hydrochloride are obtained.

M.P. 207–208.5 C. (decomp.). Colorless needles (recrystallized from methanol-ether). Yield: 90.4%.

*Analysis.*—Calcd. for $C_{18}H_{27}ON \cdot HCl$ (percent): C, 69.76; H, 9.10; N, 4.52; Cl, 11.44. Found (percent): C, 69.50; H, 9.09; N, 4.38; Cl, 11.40.

EXAMPLE 8

5 g. of 1-(3-cyclohexylpropyl)-7-methoxy-1,2,3,4-tetrahydroisoquinoline hydrochloride are treated in the same manner as described in Example 4. 2.3 g. of 1-(3-cyclohexylpropyl)-7-hydroxy-1,2,3,4-tetrahydroisoquinoline hydrochloride are obtained.

M.P. 205–206° C. (decomp.). Colorless needles (recrystallized from ethanol-ether). Yield: 48.1%.

*Analysis.*—Calcd. for $C_{18}H_{27}ON \cdot HCl$ (percent): C, 69.76; H, 9.10; N, 4.52; Cl, 11.44. Found (percent): C, 69.45; H, 9.19; N, 4.58; Cl, 11.68.

EXAMPLE 9

2 g. of 1-cyclohexylmethyl-6-hydroxy-1,2,3,4-tetrahydroisoquinoline hydrochloride and 7.6 g. of n-butyryl chloride are added to mixture of 30 ml. of chloroform and 5 ml. of dimethylformamide. The resultant mixture is refluxed moderately for 3 hours, while gradually introducing therein dry hydrogen chloride gas. During these procedures the crystals of the starting compounds dissolve. The reaction solution is filtered and the filtrate is concentrated to dryness under reduced pressure. The residue thus obtained is mixed with ether and the resulting crystals are recrystallized from a mixture of chloroform and ether. 1.30 g. of 1-cyclohexylmethyl-6-n-butyryloxy-1,2,3,4-tetrahydroisoquinoline hydrochloride are obtained.

M.P. 176–178° C. (decomp.). Colorless prisms. Yield: 52.4%.

*Analysis.*—Calcd. for $C_{20}H_{29}O_2N \cdot HCl$ (percent): C, 68.25; H, 8.59; N, 3.98; Cl, 10.07. Found (percent): C, 68.44; H, 8.66; N, 3.91; Cl, 10.08.

EXAMPLE 10

2 g. of 1-cyclohexylmethyl-6-hydroxy-1,2,3,4-tetrahydroisoquinoline hydrochloride are added to a mixture of 30 ml. of chloroform and 5 ml. of dimethylformamide. The resultant mixture is saturated with dry hydrogen chloride gas at room temperature. 7.6 g. of n-butyryl chloride are added to the mixture and the mixture is stirred for 20 hours at room temperature. During these procedures the crystals of the starting compounds dissolve. The reaction solution is treated in the same manner as described in Example 9. 1.41 g. of 1-cyclohexylmethyl-6-n-butyryloxy-1,2,3,4-tetrahydroisoquinoline hydrochloride are obtained.

M.P. 176–178° C. (decomp.).

EXAMPLE 11

2 g. of 1-cyclohexylmethyl-7-hydroxy-1,2,3,4-tetrahydroisoquinoline hydrochloride and 7.6 g. of n-butyrylchloride are added to a mixture of 40 ml. of chloroform and 5 ml. of dimethylformamide. The resultant mixture is refluxed moderately for 4 hours, while gradually introducing therein dry hydrogen chloride gas. The reaction solution is treated in the same manner as described in Example 9. 1.20 g. of 1-cyclohexylmethyl-7-n-butyryloxy-1,2,3,4-tetrahydroisoquinoline hydrochloride are obtained.

M.P. 174–177° C. (decomp.). Colorless prisms (recrystallized from ethanol-ether). Yield: 48.4%.

*Analysis.*—Calcd. for $C_{20}H_{29}O_2N \cdot HCl$ (percent): C, 68.25; H, 8.59; N, 3.98; Cl, 10.07. Found (percent): C, 67.95; H, 8.63; N, 3.88; Cl, 9.90.

EXAMPLE 12

5 g. of 1-cyclohexylmethyl-6-hydroxy-1,2,3,4-tetrahydroisoquinoline hydrochloride are added to 50 ml. of acetic acid. The resultant mixture is saturated with dry hydrogen chloride gas at room temperature. 11.5 g. of acetyl chloride are added to the mixture and the mixture is stirred for 41 hours at room temperature. The reaction solution is treated in the same manner as described in Example 9. 2.97 g. of 1-cyclohexylmethyl-6-acetoxy-1,2,3,4-tetrahydroisoquinoline hydrochloride are obtained.

M.P. 203–204° C. (decomp.). Colorless prisms (recrystallized from ethanol). Yield: 51.8%.

*Analysis.*—Calcd. for $C_{18}H_{25}O_2N \cdot HCl$ (percent): C, 66.76; H, 8.11; N, 4.32; Cl, 10.95. Found (percent): C, 67.02; H, 8.18; N, 4.34; Cl, 11.06.

EXAMPLE 13

5 g. of 1-cyclohexylmethyl-7-hydroxy-1,2,3,4-tetrahydroisoquinoline hydrochloride are added to 50 ml. of acetic acid. The resultant mixture is saturated with dry hydrogen chloride gas at room temperature. 11.5 g. of acetyl chloride are added to the mixture and the mixture is stirred for 22 hours at room temperature. The reaction solution is treated in the same manner as described in Example 9. 3.65 g. of 1-cyclohexylmethyl-7-acetoxy-1,2,3,4-tetrahydroisoquinoline hydrochloride are obtained.

M.P. 202° C. (decomp.). Yield: 63.8%.

*Analysis.*—Calcd. for $C_{18}H_{25}O_2N \cdot HCl$ (percent): C, 66.76; H, 8.11; N, 4.32; Cl, 10.95. Found (percent): C, 66.81; H, 8.10; N, 4.23; Cl, 10.57.

EXAMPLE 14

2 g. of 1-cyclohexylmethyl-6-hydroxy-1,2,3,4-tetrahydroisoquinoline hydrochloride and 6.5 g. of n-propionyl chloride are added to a mixture of 50 ml. of chloroform and 5 ml. of dimethylformamide. The resultant mixture is refluxed moderately for 4 hours, while gradually introducing therein dry hydrogen chloride gas. The reaction solution is treated in the same manner as described in Example 9. 1.38 g. of 1-cyclohexylmethyl-6-propionyloxy-1,2,3,4-tetrahydroisoquinoline hydrochloride are obtained.

M.P. 181–182° C. Colorless prisms (recrystallized from ethanol-ether). Yield: 58.0%.

*Analysis.*—Calcd. for $C_{19}H_{27}O_2N \cdot HCl$ (percent): C, 67.53; H, 8.36; N, 4.14; Cl, 10.50. Found (percent): C, 67.35; H, 8.40; N, 4.00; Cl, 10.32.

EXAMPLE 15

2 g. of 1-cyclohexylmethyl-7-hydroxy-1,2,3,4-tetrahydroisoquinoline hydrochloride and 6.5 g. of propionyl chloride are added to a mixture of 50 ml. of chloroform and 10 ml. of dimethylformamide. The resultant mixture is refluxed moderately for 6 hours, while gradually introducing therein dry hydrogen chloride gas. The reaction solution is treated in the same manner as described in Example 9. 1.40 g. of 1-cyclohexylmethyl-7-propionyloxy-1,2,3,4-tetrahydroisoquinoline hydrochloride are obtained.

M.P. 180–181° C. (decomp.). Colorless needles (recrystallized from ethanol-ether). Yield: 58.5%.

*Analysis.*—Calcd. for $C_{19}H_{27}O_2N \cdot HCl$ (percent): C, 67.53; H, 8.36; N, 4.14; Cl, 10.50. Found (percent): C, 67.31; H, 8.41; N, 4.08; Cl, 10.61.

EXAMPLE 16

1 g. of 1-(2-cyclohexylethyl)-6-hydroxy-1,2,3,4-tetrahydroisoquinoline hydrochloride is added to 10 ml. of acetic acid. The resultant mixture is saturated with dry hydrogen chloride gas at room temperature. 2.35 g. of acetyl chloride are added to the mixture and the mixture is stirred for 22 hours at room temperature. The reaction solution is treated in the same manner as described in Example 9. 0.66 g. of 1-(2-cyclohexylethyl)-6-acetoxy-1,2,3,4-tetrahydroisoquinoline hydrochloride are obtained.

M.P. 182.5–184° C. (decomp.). Yield: 52.6%.

*Analysis.*—Calcd. for $C_{19}H_{27}O_2N \cdot HCl$ (percent): C, 67.53; H, 8.36; N, 4.14; Cl, 10.50. Found (percent): C, 67.08; H, 8.23; N, 4.11; Cl, 10.92.

EXAMPLE 17

1 g. of 1-(2-cyclohexylethyl)-7-hydroxy-1,2,3,4-tetrahydroisoquinoline hydrochloride is added to a mixture of 15 ml. of chloroform and 2.5 ml. of dimethylformamide. The resultant mixture is saturated with hydrogen chloride gas at room temperature. 3.96 g. of n-butyryl chloride are added to the mixture and the mixture is stirred for 16 hours at room temperature. The reaction solution is treated in the same manner as described in Example 9. 0.43 g. of 1-(2-cyclohexylethyl)-7-n-butyryloxy-1,2,3,4-tetrahydroisoquinoline hydrochloride is obtained.

M.P. 120–123° C. Colorless prisms (recrystallized from acetone-ether). Yield: 36.7%.

*Analysis.*—Calcd. for $C_{21}H_{31}O_2N \cdot HCl$ (percent): C, 68.90; H, 8.81; N, 3.83; Cl, 9.69. Found (percent): C, 68.95; H, 8.67; N, 3.91; Cl, 9.32.

EXAMPLE 18

1 g. of 1-(3-cyclohexylpropyl)-6-hydroxy-1,2,3,4-tetrahydroisoquinoline hydrochloride is added to a mixture of 15 ml. of chloroform and 2.5 ml. of dimethylformamide. The resultant mixture is saturated with hydrogen chloride gas at room temperature. 4.5 g. of propionyl chloride are added to the mixture and the mixture is stirred for 8.5 hours at room temperature. The reaction solution is treated in the same manner as described in Example 9. 0.95 g. of 1-(3-cyclohexylpropyl)-6-propionyloxy-1,2,3,4-tetrahydroisoquinoline hydrochloride is obtained.

M.P. 145.5–146.5° C. Colorless prisms (recrystallized from acetone). Yield: 81.5%.

*Analysis.*—Calcd. for $C_{21}H_{31}O_2 \cdot \frac{1}{4} CHCl_3 \cdot HCl$ (percent): C, 64.48; H, 8.21; N, 3.54; Cl, 15.68. Found (percent): C, 64.71; H, 8.16; N, 3.58; Cl, 15.72.

EXAMPLE 19

1 g. of 1-(3-cyclohexylpropyl)-7-hydroxy-1,2,3,4-tetrahydroisoquinoline hydrochloride is added to 20 ml. of acetic acid. The resultant mixture is saturated with dry hydrogen chloride gas at room temperature. 1.53 g. of acetyl chloride are added to the mixture and the mixture is stirred for 5 hours at room temperature. The reaction solution is treated in the same manner as described in Example 9. 0.87 g. of 1-(3-cyclohexylpropyl)-7-acetoxy-1,2,3,4-tetrahydroisoquinoline hydrochloride is obtained.

M.P. 156–159° C. Colorless prisms (recrystallized from acetone). Yield: 76.8%.

*Analysis.*—Calcd. for $C_{20}H_{29}O_2N \cdot HCl$ (percent): C, 68.25; H, 8.59; N, 3.98; Cl, 10.07. Found (percent): C, 67.98; H, 8.31; N, 3.95; Cl, 10.38.

What we claim is:

1. 1-cyclohexylmethyl-6-hydroxy-1,2,3,4-tetrahydroisoquinoline or a pharmaceutically acceptable acid addition salt thereof.

References Cited

UNITED STATES PATENTS

| | | | |
|---|---|---|---|
| 2,663,709 | 12/1953 | Craig | 260—289 R |
| 2,683,146 | 7/1954 | Robinson | 260—289 R |
| 3,557,122 | 1/1971 | Shavel et al. | 260—289 A |
| 3,647,799 | 3/1972 | Watanabe | 260—289 X |
| 3,497,516 | 2/1970 | Mashimo | 260—286 R |

OTHER REFERENCES

Battersby, Chem. Abstr., vol. 56, pp. 4721-2 (1962).

DONALD G. DAUS, Primary Examiner

U.S. Cl. X.R.

260—286 R, 287 R; 424—258